Aug. 27, 1929.  J. M. SCOTT ET AL  1,726,243
SIGNAL FOR PNEUMATIC TIRES
Filed Sept. 24, 1928
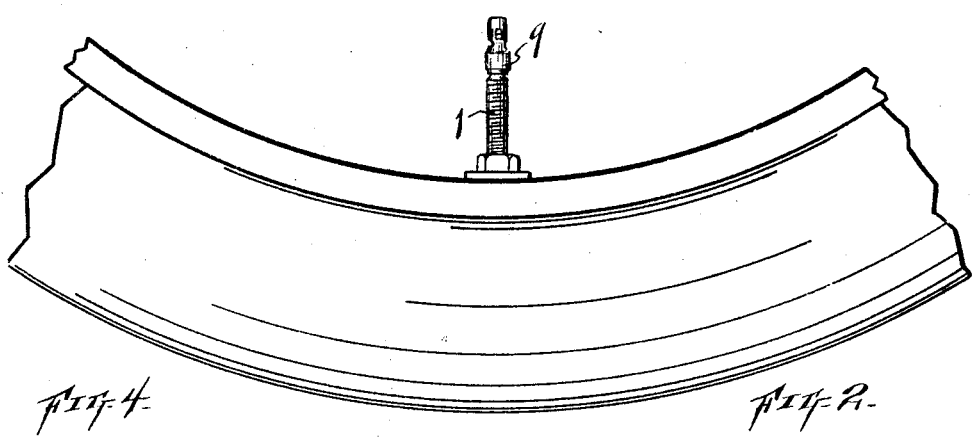
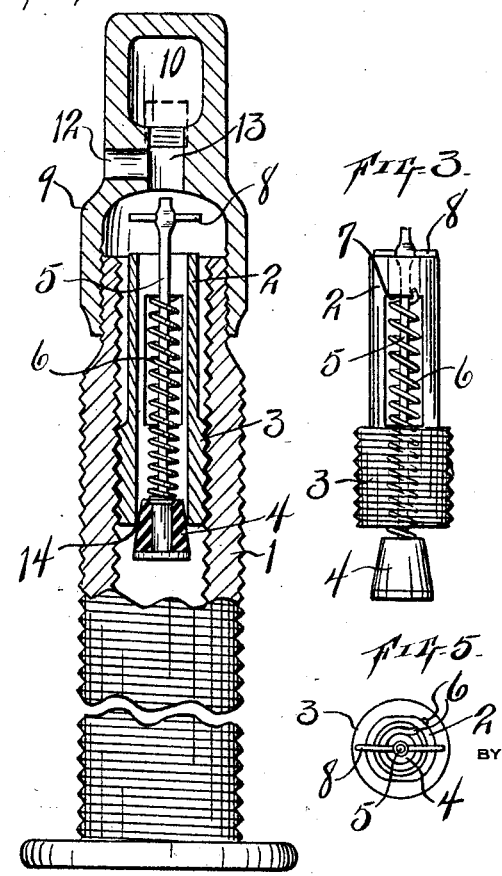
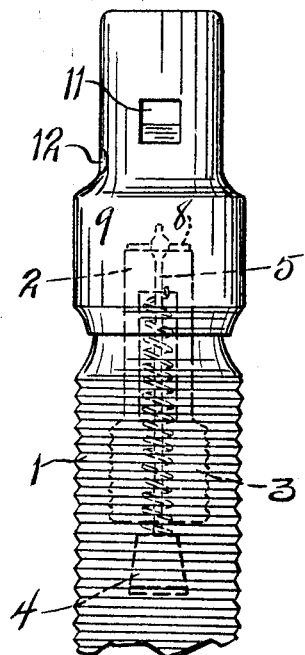
INVENTORS
JOHN M. SCOTT
—AND—
WILLIAM L. DAYTON.
A. L. Jackson
ATTORNEY Patented Aug. 27, 1929.

1,726,243

UNITED STATES PATENT OFFICE.

JOHN M. SCOTT AND WILLIAM L. DAYTON, OF FORT WORTH, TEXAS.

SIGNAL FOR PNEUMATIC TIRES.

Application filed September 24, 1928. Serial No. 308,087.

Our invention relates to filling nozzles and more particularly to filling nozzles provided with signaling attachments; and the object is to provide simple means for giving an alarm when the air becomes too weak in a pneumatic tire and the advantage is that the devices may be set to give an alarm at a predetermined pressure in the tire. Another advantage is that the devices do not change the form of standard makes of filling nozzles and the expense of making the same will be only slightly more than the usual filling nozzles. Other objects and advantages will be fully explained in the following description and the invention will be more particularly pointed out in the claims.

Reference is had to the accompanying drawings which form a part of this application.

Fig. 1 illustrates the improvements applied to a pneumatic tire.

Fig. 2 is a side elevation of a nozzle on a large scale provided with the improvements, showing the valve open.

Fig. 3 is a similar view partly in section with the valve closed.

Fig. 4 is a side elevation on an enlarged scale of the cage and valve with the valve open.

Fig. 5 is a plan view of the same.

Similar characters of reference are used to indicate the same parts throughout the several views.

The drawings show a nozzle 1 of ordinary type. The improved valve attachments are included in a cage 2 which is generally in cylindrical form but the sides have relatively large slots and the lower part 3 to be screwed into the body 1 for mounting the cage and valve. A valve 4 is provided and seats against the bottom of the cage 2. The valve 4 is provided with a stem 5 and a spring 6 is mounted on the stem 5 and seats at the lower end on the valve 4 and the upper end projects out of the basket or cage 2 and engages a shoulder 7. The stem 5 is provided with a cross pin 8 which will prevent the valve and its stem and spring from falling through the cage. When the tire is to be filled, the stem 5 is pressed down by the nozzle of the filling hose as usual for opening the valve. As soon as the filling hose nozzle is removed the air pressure will force the valve to closed position as shown in Fig. 4. The spring 5 may be prepared to resist whatever pressure may be desired. If a person wants an alarm given when the pressure in the tire becomes as low as twenty pounds, the spring will be prepared to resist a pressure of twenty pounds but not more. If the pressure in the tire goes below twenty pounds, the spring 6 will press the valve 4 open. Air will then rush out past the valve 4 and out through the whistle below described.

The whistle 9 takes the place of the ordinary dust cap. The whistle 9 is screwed on the filling nozzle 1 in the same manner as a dust cap. The whistle 9 has a cavity 10 in the upper part and a vent 11 and also an opening 12 and air inlet passage 13. No air can pass out until the valve 4 is separated from the seat 14. As soon as the air pressure in the tire goes below the predetermined resistance pressure of the spring 6, the alarm will be sounded.

What we claim is:—

1. A signal for pneumatic tires in combination with filling nozzle of an inner tube comprising a tubular cage screwed into the filling nozzle and provided with a valve seat on the inner end thereof, a valve provided with a stem projected through said cage for suspending said valve in operative relation to said cage, a seat formed in said cage for a spring, a spring mounted on said stem and seated on said valve and against the last named seat, and a whistle attached to the outer end of said nozzle.

2. A signal for pneumatic tires in combination with the filling nozzle of an inner tube comprising a tubular cage screwed into the filling nozzle and provided with a valve seat on the inner end thereof, and a seat near the outer end thereof for a spring, a valve operatively connected with said cage and adapted to engage said valve seat, a stem for said valve projected through said cage and provided with a support adapted to rest on top of said cage, a spring mounted on said stem and seated on said valve and against said spring seat, said valve adapted to close the passage through said cage and said spring adapted to open said valve when the pressure goes below a predetermined pressure, and a whistle attached to said nozzle and communicating with said cage.

3. A signal for pneumatic tires in combination with the filling nozzle of an inner tube comprising a tubular cage mounted in said nozzle and closing the passage through said nozzle except through the cage, a valve adapted to close the passage through said cage, a spring operatively connected with said cage and valve for opening said valve when the pressure through said nozzle goes below a predetermined pressure, and a whistle connected to said nozzle.

In testimony whereof, we set our hands, this 19th day of September, 1928.

JOHN M. SCOTT.
WILLIAM L. DAYTON.